Sept. 11, 1962 S. H. HOLMES 3,052,918
HYDRAULIC MOLDING APPARATUS
Filed Aug. 4, 1958 2 Sheets-Sheet 1
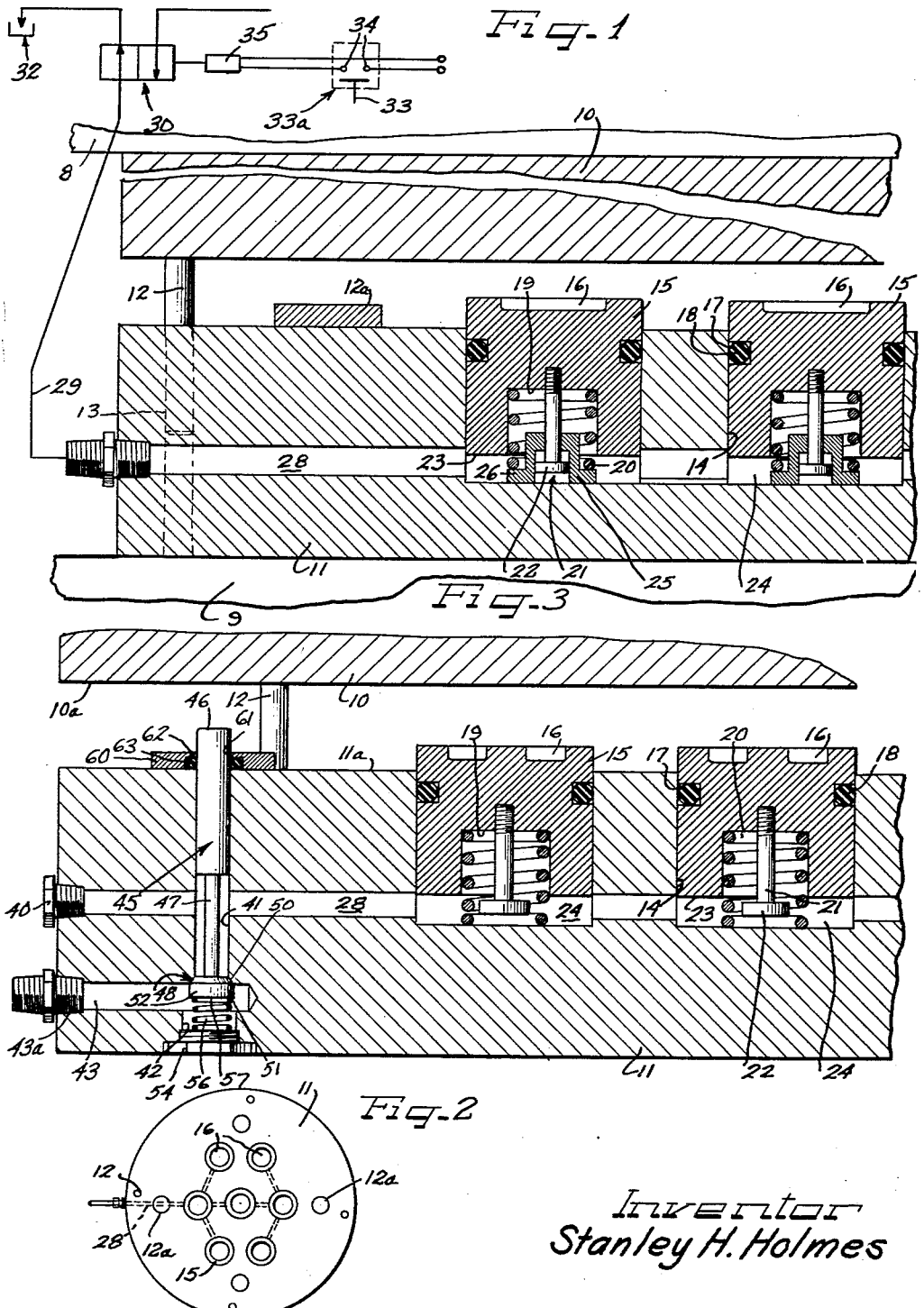
Inventor
Stanley H. Holmes

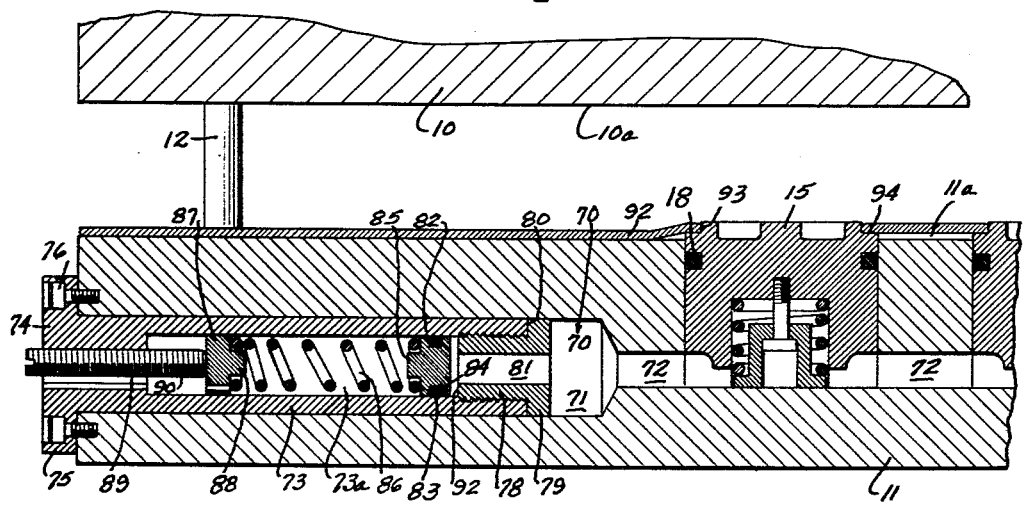
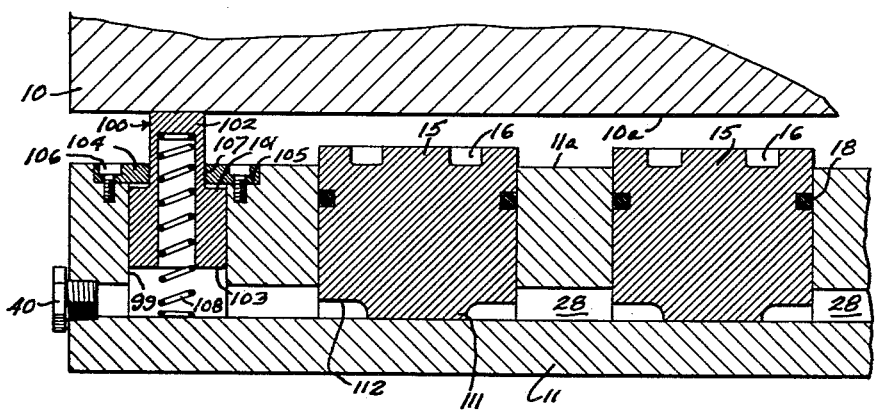

United States Patent Office 3,052,918
Patented Sept. 11, 1962

3,052,918
HYDRAULIC MOLDING APPARATUS
Stanley H. Holmes, 3300 W. Lake St., Chicago, Ill.
Filed Aug. 4, 1958, Ser. No. 752,800
2 Claims. (Cl. 18—16)

This invention relates to a molding apparatus and more particularly to a means for equalizing mold cavity closure pressures in a multiple cavity mold.

As it is well known in the art, it is extremely difficult in molding thermosetting materials in a multiple cavity mold to equalize the closing force on each of the cavities in a platen to produce a plurality of thermoplastic parts having similar characteristics.

Even when the land surfaces of a pair of platens are ground to extremely fine tolerances, the platens or cavity enclosure plates generally have some flexure when high ram pressures are used to close the platens.

Taking cognizance of this problem, applicant has devised a means for equalizing the closure pressure exerted on each of a plurality of mold cavities and has further provided a means for providing a cavity closure pressure substantially greater than that of the closure pressure of the hydraulic or mechanical ram which is used to close the platens.

Applicant accomplishes this highly advantageous feature by forming the mold cavities in or mounting the mold cavities on a movable cavity member which rests on a hydraulic base. By intercommunicating the hydraulic fluid in each of a plurality of wells within which the movable cavity members slidably move, the closure pressure on each of the mold cavities will be exactly the same regardless of flexure of either of the platens and regardless of defects in the land surface of the platens and/or defects in one or more of the mold cavities themselves.

Furthermore, since the horizontal land surface of the cavity members represents only a small part of the total area of the press platens, hydraulic pressure may be exerted to the underside of the movable cavity members so that individual cavity closing pressure can be raised to a point considerably above that of the closing ram pressure of the platens themselves.

Thus, for instance, if the hydraulic or mechanical ram used to close the upper and lower platens in a molding press is 2000 pounds per square inch hydraulic pressure may be directed to the underside of the movable cavity members so that the closure pressure of the mold cavities can be raised to a point, for instance, of 2200 pounds per square inch, which represents a substantial increase in pressure over that of the ram pressure closing the platens.

Thus, applicant has not only provided a means for equalizing the cavity closing pressure of each of a plurality of cavities in a multiple cavity mold but has, further, provided a means for maintaining a cavity closing pressure substantially greater than that of the ram closing pressure of the press platens. Applicant has further defined his invention so that the cavity compensation may manually be adjusted as desired for varying the amount of cavity closing pressure in both open and closed hydraulic fluid systems.

Accordingly, it is a principal object of this invention to provide a means for equalizing cavity closing pressure in a multiple cavity mold.

It is another object of this invention to provide in a molding mechanism of the type above described a means for maintaining a cavity closing pressure greater than the ram closing pressure of the press platens.

It is a still further object of this invention to provide a means for varying the cavity closing pressure for a plurality of mold cavities in a molding press independent of the adjustment means for the ram press mechanism itself.

It is a still further object of this invention to provide a device of the type above described wherein hydraulic fluid under pressure is directed to the underside of the movable mold cavity members in accordance with the closing movement of the upper and lower platens.

These and other objects of the invention will appear from time to time as the following specification proceeds and with reference to the accompanying drawings, wherein:

FIG. 1 is a fragmentary vertical sectional view through a multiple cavity mold constructed in accordance with the principles of the present invention;

FIG. 2 is a plan view of a typical multiple cavity mold such as is illustrated in FIG. 1;

FIG. 3 is another vertical sectional view through a multiple cavity mold showing a second embodiment of a device constructed in accordance with the principles of this invention;

FIG. 4 is another fragmentary vertical sectional view through a multiple cavity mold utilizing a closed hydraulic system for equalizing thrust between cavity connecting members; and FIG. 5 is another fragmentary vertical sectional view of a non-spring biased cavity pressure-equalizing mechanism constructed in accordance with the principles of this invention.

In the embodiment of the invention illustrated in FIG. 1 there are fragmentarily shown upper and lower platens or mold members 10 and 11, respectively, which are aligned with one another by guide dowel pins 12 which project from the underside of the upper platen 10 and which are arranged to be received within the guide holes 13 in the lower platen 11. The upper and lower platens may be placed in a hydraulic or mechanical ram press so that upper and lower press platens 8 and 9 abut platens 10 and 11 and can be arranged to be closed at a pressure of up to many thousands of pounds depending on the size and pressure potential of the ram press and the materials to be molded.

A plurality of wells 14 are arranged in the lower platen 11 to receive movable cavity members 15 therein. Each of the movable cavity members 15 has a mold cavity 16 formed in the upper portion thereof in the shape of the article to be molded. A peripheral groove 17 in each of the movable cavity members 15 is arranged to receive an O-ring 18 for the purpose of maintaining a fluid tight seal between the cavity member 15 and the inner walls of the wells 14.

The underside of the movable cavity member 15 is shown as being recessed as at 19 to receive a spring member 20. A stop 21 is threadedly mounted in the movable cavity member 15 and is centrally positioned within the recess portion 19. The stop 21 has an enlarged head 22 on the outer end thereof which lies in a plane substantially below that of the undersurface 23 of the movable cavity member 15. A spring retainer 25 having an annularly flanged portion 26 extending therefrom is arranged to guide and form a reaction member for the spring member 20.

It will now become apparent that when the hydraulic or mechanical ram press is actuated the upper platen will move downwardly to abut and force the movable cavity member 15 downwardly within the well 14. As is well known in the art, the intense pressure exerted by the ram on the upper and lower platens will cause flexure of the upper or lower platens or of both of the platens so that the upper platen will not seat evenly against the land surfaces of each of the cavity members in a mold in which there is no individual cavity compensation. Applicant, however, provides a means for hydraulically compensating for such flexure or for worn or damaged components by hydraulically individually supporting each of the movable cavity members in the manner to be hereafter described.

Transverse bores 28 are drilled within the lower platen 11 and open to a plurality of the wells 14. As shown diagrammatically in FIG. 1, a hydraulic line 29 leads to each of the bores 28 from a two position three way solenoid control valve 30 which is connected with a hydraulic pressure source. The actuating piston (not shown) within the control valve 30 is biased by a spring member into a position to intercommunicate the hydraulic line 29 with a reservoir 32. When, however, the hydraulic or mechanical ram (not shown) is actuated, a movable switch arm 33 of a pressure switch 33a will be moved to close the electrical energizing circuit across the contacts 34 to energize the solenoid 35. Actuation of the solenoid 35 will move the actuating piston to close communication between the reservoir 32 and hydraulic line 29 and simultaneously open communication between the pressure source and the hydraulic line 29 to direct hydraulic fluid through the bores 28 to hydraulic chambers 24 which lie between the ends of the wells 14 and the movable cavity members 15.

If, for instance, the ram closing force transmitted to platens 10 and 11 by the ram press platens 8 and 9 is approximately 2000 pounds per square inch and hydraulic fluid is directed to the bore 28 under a pressure of 2200 pounds per square inch each of the movable cavity members 15 will be closed by the upper platen 10 with an individual cavity pressure force of 2200 pounds per square inch. Although the individual cavity pressure exceeds the ram pressure on the platens, the platens will not be moved apart, since, as hereinbefore explained, the total surface area of the individual movable cavity members 15 is substantially smaller than that of the total surface area of either of the platens. Furthermore, it will be seen that each of the movable cavity members 15 within the wells 14 which are communicable with the bore 28 will abut the upper platen 10 with the same closure force regardless of the amount of flexure in the upper or lower platens.

As shown in FIGS. 1 and 2, stop discs 12a are secured to the lower platen 11 and are arranged to provide a seat for the upper platen 10, as is well known in the art. The total surface area of the stops 12a must, of course, be added to the total surface area of the cavity members 15 when computing the amount of cavity closure pressure which can be attained through the use of the hydraulic compensating means hereinbefore described. Obviously, the stops 12a reduce the pressure acting on the cavity members 15 from the platen 10 in the ratio of the differences in the surface areas of the stops and the cavity members.

It will further be apparent that when the ram is deactuated the movable contact 33 in the pressure switch 33a will be moved out of electrical contact with the stationary contacts 34 to deenergize the solenoid 35 and to thus allow the spring member to move the actuating piston to again communicate the reservoir 32 with the hydraulic line 29.

It should herein be noted that any suitable hydraulic fluid may be used which remains a fluid or becomes a fluid at operating temperatures. Such fluids may comprise high flash point oils or low melting point metals or metal alloys.

Referring now more particularly to FIG. 3, a second embodiment of the invention is shown wherein many parts are identical with those shown in FIG. 1 and have like numbers. In this embodiment of the invention, however, a different means is shown for directing hydraulic pressurized fluid to the wells 14. As with the device illustrated in FIG. 1, a transverse bore 28 is provided in the lower platen 11 which opens to a plurality of the wells 14 and which is threaded at its outer end portion to receive a sealing plug 40. A second bore 41 is drilled vertically within the lower platen 11 which intersects the bore 28 and which terminates in a radially enlarged threaded end portion 42 which opens to the underside of the platen 11. A third bore 43 is drilled horizontally within the lower platen 11 at a point below that of the bore 28 and intersects the vertical bore 41.

A piston rod 45 having a radially enlarged upper end portion 46 and a radially reduced lower end portion 47 is positioned within the vertical bore 41 so that the radially enlarged upper end portion 46 slidably engages the inner walls of the bore 41. It will be noted that the port 48 which opens from the vertical passageway 41 to the horizontal bore 43 is chamfered as at 50 to coact with a chamfered edge 51 on a valve member 52 which is rigidly mounted on the outer end of the radially reduced portion 47 of the piston rod 45. A sealing plug 54 is threadedly mounted within the radially enlarged lower end portion of the vertical bore 41 and is arranged to provide a seat for a spring member 56 which abuts at its upper end portion the valve face 57 of the valve member 52.

In this embodiment of the invention a stop disc 60, similar in function and consequence to the stops 12a hereinbefore described, is shown as being mounted on the land surface 11a of the lower platen 11 and has a central aperture 61 therein through which the movable piston 45 protrudes. An annular channel 62 is provided about the inner marginal edge of the stop disc and is arranged to receive an O-ring 63 to maintain a fluid tight seal between the stop disc 60 and the movable piston member 45. It will be understood that similar stops such as these will be provided at many points on the land surface of the lower platen 11 and may, in fact, comprise a series of annular rings rather than a plurality of discs. It will, of course, be further understood that if so desired there need be no stops at all and an annular channel similar to the channel 62 may be provided within the platen 11 itself about the bore 41 to receive the O-ring 63.

It will be noted that a source of pressurized hydraulic fluid may be connected to the horizontal bore 43 at its threaded inlet 43a and that when the platens 10 and 11 are moved toward one another by the hydraulically movable press platens 8 and 9, the land surface 10a of the upper platen will engage the upper end of the movable piston 45 before the platen 10 moves into contact with the stop disc 60 to move the piston member 45 to thus unseat the valve member 52 from the chamfered edge 50 of the port 49. In this manner, fluid will be communicated with the hydraulic chambers 24 through the bore 28 and the vertical passageway 41. When the hydraulic or mechanical ram pressure is released the control valve 30 will be deactuated to communicate the horizontal bore 43 with a fluid reservoir and the upper platen 10 will simultaneously move upwardly from the lower platen 11 to thus release the upward force acting on the upper end of the piston rod 45. The valve member 52 will, of course, remain in the open position with respect to the port 48 when contacted by platen 10 until the platen moves upwardly, at which time the spring member 56 will bias the valve member 52 into engagement with the chamfered surface 50 of the port 48 to close communication between the hydraulic pressure source and the hydraulic chambers 24.

Since the radially enlarged lower end portion of the vertical bore 41 is formed so as to have a diameter greater than the diameter of the valve member 52 the piston member 45 may readily be replaced or initially inserted through the radially enlarged end portion 42 of the passageway 41 by removal of the sealing plug 54 and the spring member 56. This obviously accommodates a simple assembly procedure and facilitates quick removal of the piston 45 when necessary for repair.

Referring now to FIG. 4 of the drawings, a closed hydraulic system is shown for resiliently supporting the individual movable cavity members 15. In this embodiment of the invention transverse bores 70 are drilled horizontally within the lower platen 11 and have a radially enlarged outer end portion 71 and a radially reduced inner end portion 72 which open to a plurality of wells 14. A hollow cylinder 73 having a closed end portion 74 is arranged to fit snugly within the radially enlarged outer end portion 71 of the bore 70 and to be sealed in fluid tight relation with the inner walls thereof. An annular flange 75 on the outer end of the cylinder 73 is formed integrally with the closed end portion 74 of the hollow cylinder 73 and is arranged to abut and be connected to the sidewall of the lower platen 11 by a plurality of screws 76. A cap 78 having an outer annular flange 79 at one end thereof is arranged to be threadedly mounted within the inner end of the hollow cylinder 73 so that the innermost edge 80 of the cylinder 73 abuts the annular flange 79. A longitudinal passageway 81 is formed within the cap 78 which opens to the hollow interior 73a of the cylinder 73.

A valve member 82 is slidably mounted within the hollow interior 73a of the cylinder 73 and has a peripheral annular channel 83 formed therein which is arranged to receive an O-ring 84 to seal the valve member 82 to the inner walls of the cylinder 73. The valve member 82 further has a boss 85 on the inner surface thereof which is arranged to guide a spring member 86 which seats against the annular surface of the valve member 82. The spring member is abutted at its other end portion by a reaction member 87 which has, similarly, a protruding guide boss 88 for the spring 86.

A longitudinal threaded bore 89 is formed within the closed end portion 74 of the cylinder 73 to threadably receive an adjusting screw 90 which is rigidly connected to or formed integrally with the reaction member 87. An adjusting knob may, of course, be connected to the outer end portion of the adjusting screw 90 to provide a means for rotating the screw within the threaded bore 89.

It will now become apparent that the valve member 82 is normally arranged to seat against the inner annular surface 92 of the cap 78 but that upon increases in hydraulic pressure within the passage 81 in the cap 78 the valve member 82 will be moved retractably within the cylinder 73 against the force of the biasing spring 86. Thus, when the upper platen 10 moves toward the land surface of the lower platen 11 by the action of the movable ram press platens 8 and 9, the upper platen will move into engagement with the movable cavity member 15 thus depressing the cavity member 15 until the ram pressure acting on the cavity member is equalized by hydraulic pressure within the well 14 acting upwardly on the cavity member. As hereinbefore has been briefly described, if the ram closing pressure is 2000 pounds per square inch the movable cavity member 15 within the well 14 will move downwardly until the hydraulic fluid within the well 14 has been compressed to the point whereat it exerts an upward equalizing force of 2000 pounds per square inch. If, however, the adjusting screw 89 has been adjusted inwardly a sufficient distance to maintain a hydraulic pressure within the well 14 of 2500 pounds per square inch, the closure pressure between the upper platen and the movable mold member 15 will, as has been hereinbefore explained be 2500 pounds per square inch. Obviously, the relative position of the adjustable reaction member 87 within the cylinder 73 and the compressive force of the spring member 86 will predetermine the amount of hydraulic pressure which will be maintained within each of the wells 14 connected to the radially reduced portion 72 of the bore 70 for any given ram pressure.

It will be noted that a thin flexing plate 92 having a plurality of annular apertures 93 therein is arranged to seat against the annular shoulders 94 which are cut back from the land surface of the movable cavity members 15. The purpose of this thin flexing plate 92 is to prevent molding material from flowing, in the plastic state, down along the sides of the movable cavity members 15 between the outer walls of the cavity members and the inner walls of the wells 14.

FIG. 5 illustrates an alternative closed hydraulic system designed for providing fluid pressure compensation for a plurality of cavities in a multiple cavity mold. As illustrated in FIGS. 1 through 4, a horizontal bore 28 is drilled within the lower platen 11 and opens to a plurality of wells 14. In this embodiment of the invention a vertical passage 99 is drilled within the lower platen 11 from the land surface 11a which intersects and opens to the transverse bore 28. A hollow piston 100 has a shoulder 101 formed intermediate a radially reduced outer end portion 102 and a radially enlarged inner end portion 103. A closure plate 104 is arranged to fit within a recess 105 in the land surface 11a of the lower platen 11 and is maintained in engagement therewith by a plurality of screws 106. A central aperture 107 is formed in the closure plate 104 and is arranged to slidably receive the radially reduced outer end portion 102 of the sliding piston 100. A spring member 108 having its lower end portion abutting the lowermost end of the vertical passage 99 and having its upper end abutting the inner wall of the hollow sliding piston 100 is arranged to normally bias the shoulder 101 of the sliding piston 100 into engagement with the undersurface of the closure plate 104.

In this embodiment of the invention, the movable cavity member 15, unlike the cavity members in the other embodiments of this invention, does not have a recessed undersurface but has a depending boss 111 which is arranged to abut the lowermost portion of the well 14 to provide an annular lifting surface 112 intermediate the sidewalls of the cavity member and the boss 111.

It will now become apparent that if hydraulic fluid such as high flash point oil or liquid metal is contained within the bore 28 and the recesses communicable therewith, closure of the platens 10 and 11 will move the piston 100 downwardly within the vertical bore 99 to thus direct hydraulic fluid under pressure to act against the lifting face or annular undersurface 112 of the movable cavity member 15 to raise the cavity member 15 within the well 14 so as to provide a fluid pressure base for the cavity members 15 under the entire lower surface thereof before the upper platen 10 contacts the cavity members 15.

This design is, of course, particularly desirable for closed system hydraulic actuating devices such as those illustrated in FIG. 4, in that it is unnecessary to provide a return spring for each of the many movable cavity members 15 in the lower platen 11. Obviously, it is only necessary to provide a single spring for each of the pistons 100 which may be incorporated in the molding apparatus. It may, of course, be desired to communicate the bore 28 with each of the wells 14 in the lower platen or, on the contrary, it may be desirable to provide several hydraulically closed systems within a single platen.

It will herein be understood that these embodiments of the invention have been used for illustrative purposes only and that various modifications and variations of the present invention may be effected without departing from the spirit and scope of the novel concepts thereof.

I claim as my invention:

1. A multiple cavity pressure molding apparatus including a ram and upper and lower platens arranged to be closed by said ram, a plurality of wells within said lower platen opening to the land surface thereof, a plurality of movable cavity members within said wells forming with the ends of said wells hydraulic chambers for containing hydraulic fluid, mold cavities in said cavity members opening to the land surfaces thereof, first and second spaced bores within said lower platen, said first bore communicable with a plurality of said hydraulic chambers, said second bore communicable with a source of pressurized hydraulic fluid, a third bore within said lower platen intersecting and opening to said first and said second bores, a piston slidably mounted within said third bore and extending above the land surface of said lower platen, a port formed at the intersection of said second and said third bore defined by the inner walls of said third bore, valve means on said piston cooperable with said port to control fluid flow therethrough and actuatable by closure of said platens to open communication between said second and said third bores.

2. A multiple cavity pressure molding apparatus including a ram and upper and lower platens arranged to be closed by said ram,
   a plurality of wells within one of said platens opening to the land surface thereof,
   a plurality of movable cavity members within said wells forming with the ends of said wells hydraulic chambers for containing hydraulic fluid,
   mold cavities in said cavity members opening to the land surfaces thereof,
   said one of said platens defining passages inter-communicating a plurality of said hydraulic chambers,
   a source of pressurized fluid,
   conduit means for communicating the source of pressurized fluid with said passageways and said hydraulic chambers,
   and valve means including a piston actuated by the other of said platens and a valve member carried by the piston and biased to close the conduit means,
   said valve means being movable in said conduit means in response to the approach of the upper and lower platens toward one another to open the conduit means and thereby to communicate at least one of said hydraulic chambers with said source of pressurized hydraulic fluid.

References Cited in the file of this patent

UNITED STATES PATENTS

| | | |
|---|---|---|
| 1,992,314 | Laussuco | Feb. 26, 1935 |
| 2,005,260 | Huyett | June 18, 1935 |
| 2,298,057 | Kelm | Oct. 6, 1942 |
| 2,358,353 | Stacy | Sept. 19, 1944 |
| 2,380,659 | McDougal | July 31, 1945 |
| 2,437,003 | Ruegg | Mar. 2, 1948 |

FOREIGN PATENTS

| | | |
|---|---|---|
| 551,318 | Great Britain | Feb. 17, 1943 |